United States Patent [19]

Bryant

[11] Patent Number: 4,894,276

[45] Date of Patent: Jan. 16, 1990

[54] BONDED GLASS FABRIC EDGE

[75] Inventor: Michael I. Bryant, Thomasville, N.C.

[73] Assignee: BGF Industries, Inc., Greensboro, N.C.

[21] Appl. No.: 863,725

[22] Filed: May 16, 1986

[51] Int. Cl.[4] .................. D03D 5/00; D03D 15/00; D03D 25/00; D06C 27/00

[52] U.S. Cl. .................................. 428/193; 28/140; 38/144; 139/50; 139/54; 139/420 C; 156/148; 428/296

[58] Field of Search .............. 28/140; 38/144; 139/50, 139/54, 420 C, 435; 156/148; 428/193, 296

[56] References Cited

U.S. PATENT DOCUMENTS

| | | |
|---|---|---|
| 1,320,634 | 11/1919 | Moller . |
| 1,709,887 | 4/1929 | Sponholz . |
| 1,854,693 | 4/1932 | Dickie et al. . |
| 2,319,307 | 5/1943 | Eddy et al. . |
| 2,594,521 | 4/1952 | Tingley . |
| 2,769,222 | 4/1950 | Southwell . |
| 2,840,117 | 6/1958 | Scruggs . |
| 3,076,252 | 2/1963 | Hofmann . |
| 3,272,687 | 9/1966 | Harrington, Jr., et al. . |
| 3,369,957 | 2/1968 | Caroselli et al. . |
| 3,515,623 | 6/1970 | Bates . |
| 3,695,326 | 10/1972 | Bryant et al. . |
| 3,881,522 | 5/1975 | Lewis et al. . |
| 4,384,021 | 5/1983 | Aoyama . |
| 4,401,782 | 8/1983 | Conklin et al. ............... 428/394 |
| 4,581,392 | 4/1986 | Armstrong et al. . |
| 4,774,135 | 9/1988 | Bryant ............................ 428/392 |

FOREIGN PATENT DOCUMENTS

| | | |
|---|---|---|
| 18568 | 3/1973 | Japan . |
| 34094 | 3/1977 | Japan . |
| 623735 | 5/1949 | United Kingdom . |
| 942942 | 12/1959 | United Kingdom . |
| 2051896 | 1/1981 | United Kingdom . |

*Primary Examiner*—James C. Cannon
*Attorney, Agent, or Firm*—Nixon & Vanderhye

[57] ABSTRACT

Feathered edges of fiberglass fabrics woven on a shuttleless or airjet loom are secured and prevented from ravelling by a glass yarn coated with a hot melt composition. The coated yarn is woven along the longitudinal edges of the fabric, typically in a leno weave, then heated to thermobond the adjacent glass fibers with the hot melt composition at their crossover points. A procedure for applying a hot melt to a yarn through a heated die is used.

9 Claims, 1 Drawing Sheet

BONDED GLASS FABRIC EDGE

This invention pertains to woven glass fiber fabrics and, in particular, to fiberglass cloths woven on a shuttleless loom having the edge yarns secured in place by a hot melt composition. Bonded glass fabric edges prevent the warp ends of the glass fabric from becoming unravelled.

BACKGROUND OF THE INVENTION

The shuttleless or airjet weaving process has been widely adopted for weaving glass fabrics of improved quality and edge to edge uniformity. However, the resulting product has a feathered edge that is apt to become unravelled during further processing and treatment of the woven glass cloth. The need to secure the feathered edges of glass fabrics woven on a shuttleless loom is apparent. Several procedures have been used in the past to stabilize yarns at their crossover points. This may take the form of stabilization throughout the full width of the fabric for specific applications, such as tire cords, as illustrated in U.S. Pat. No. 3,695,326, or it may take the form of stabilizing only an edge of the fabric, as in U.S. Pat. No. 3,515,623. This latter patent describes securing the edge of a woven glass fiber fabric by weaving the fabric with a thermoplastic material such as nylon in strand form using the nylon yarn as selected warp ends. After weaving, the fabric is heated in the area of the woven nylon yarns. This heating locally melts the woven thermoplastic strand and serves to stabilize the fabric structure of the resulting product and to bond the warp and weft crossovers to provide security against ravelling. In the weave arrangement depicted in this patent, the thermoplastic strand material is woven into the material in leno fashion.

The use of a leno woven thermoplastic strand to locally stabilize a fabric structure has a number of disadvantages—significant temperatures are required to locally melt the thermoplastic strand material and to cause the overlapping glass fiber strands to bond. Typically, this heating required for thermobonding is in the range of 350°–500° F., however such high temperatures often cause brown discoloration at least at the edges of the glass fabric due to charring of the warp size and yarn binder, two processing adjuvants commonly used in the weaving of fiberglass cloth. Moreover, thermoplastic strand materials of this type tend to melt unevenly causing unacceptable lumps in the resulting glass fabric and thermoplastic build-up on the elements used to melt the thermoplastic yarn. Most annoying are the noxious fumes given off by certain of the thermoplastic yarns, particularly nylon and vinyl, during the heating or thermobonding operation.

Other approaches to secure the edges of woven materials include the use of adhesive tapes attached to the ends of glass cloth, resin varnishes, or powdered hot melt resins as described in U.S. 4,428,995.

None of these prior procedures is well suited to prevent edge ravelling of a glass fabric woven on a commercial scale on a shuttleless loom to produce a secured, feathered edge fiberglass fabric.

DETAILED DESCRIPTION OF THE INVENTION

The outer edge warp yarns of a glass fabric produced by a shuttleless weaving process are secured and bonded together to prevent ravelling by the use of a pair of outside warp ends, typically woven as a leno weave, coated with a hot melt composition such that upon thermobonding the hot melt adhesive-coated yarns attach and bond to the adjacent glass fibers. More specifically, a glass fabric is prepared on a shuttleless or airjet loom that includes weaving two or more glass fiber yarns, one or more of which have hot melt adhesive coated, woven as a locking type leno weave adjacent the two longitudinal edges of the cloth. The leno yarns cross over each other and interlace one or more fill yarns. Once woven, the cloth is subjected to heat such as direct contact, hot air or radiant heat and the hot melt adhesive composition is thermobonded securing the fibers of the edge of the glass fabric and preventing edge ravelling.

Figure 2:
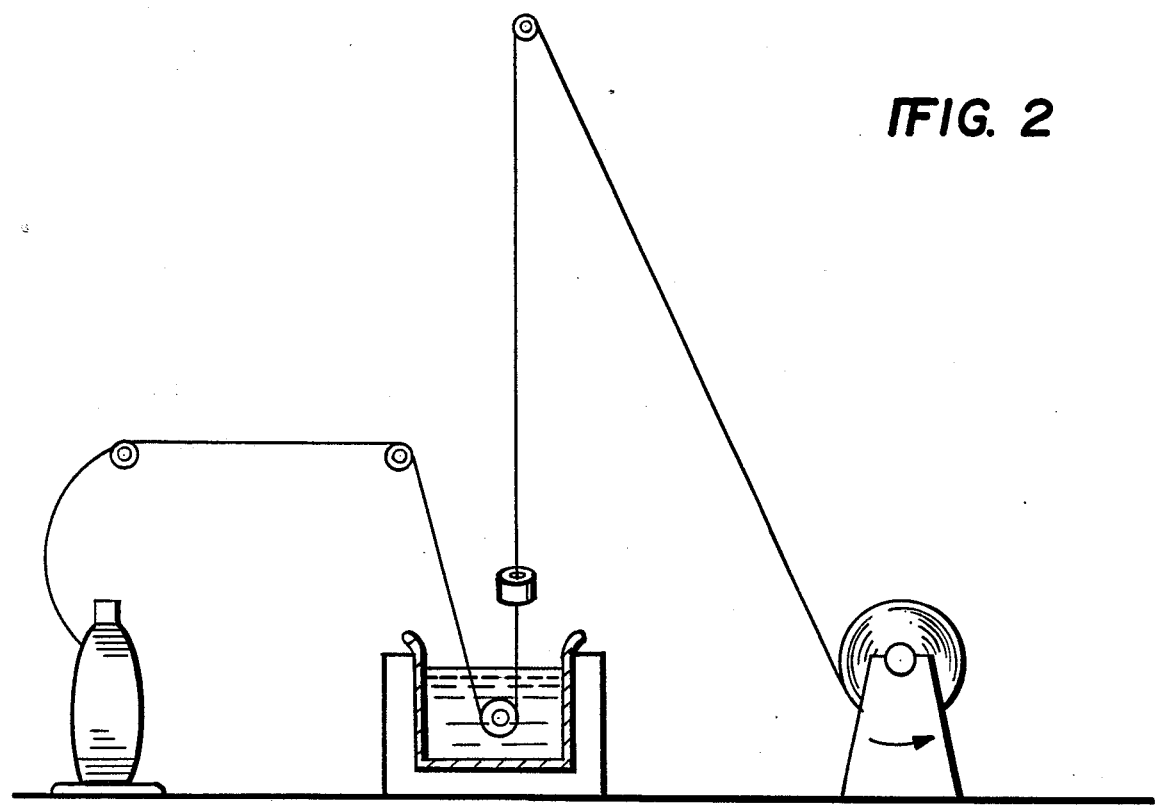
FIG. 2 is a schematic representation of an apparatus for coating a hot melt adhesive onto a yarn using a heated die.

Also disclosed is an apparatus for coating a hot melt adhesive composition onto a yarn by passing the dipped yarn through a heated die. Although not limited to the type of yarn, glass fiber yarn, particularly for use in the present invention, is preferred. Thermoplastic coated fiberglass yarn is provided with a coating with variable coating content, depending upon the size of the orifice through which the yarn is pulled. As illustrated in FIG. 2 of the drawings, a yarn is removed from a package, dipped through a heated bath containing the hot melt adhesive in which the yarn is impregnated with the adhesive. Thereafter, the yarn is passed upwardly through a coating die which, when provided with the appropriately size orifice, squeezes the hot melt adhesive coating into the yarn bundle and removes or doctors off the excess coating. A molten hot melt is maintained by appropriate heating means (not shown) and the yarn to be impregnated passes through that hot melt. Using the appropriate hot melt adhesive, the coated yarn requires only a brief exposure to ambient temperatures in order to allow the coating to cool below the melt temperature, thus costly oven drying and/or curing procedures and arrangements are not required. In the apparatus depicted in FIG. 2, the yarn coated with the hot melt is rapidly cooled to below the melt temperature and the coated yarn is ready for use without further processing or drying steps.

The disclosed hot melt, heated die method for coating yarn is not necessarily limited to glass fiber yarn so long as the yarn employed is stable and accommodates the temperature consistent with the hot melt temperature for the hot melt adhesive. Similarly, the hot melt adhesive is selected to form a melt at a temperature that does not degrade or substantially degrade the desirable characteristics of the yarn. A wide variety of hot melt materials suitable for application via a heated die are disclosed below. The amount of coating applied to the yarn or "add-on" is conveniently adjusted by choosing the appropriate die orifice in relation to the size of the yarn, thus operating with a fixed yarn size and orifice size, the amount of hot melt adhesive pick-up is not unduly affected by speed, temperature, or viscosity variations of the hot melt adhesive during operation. The procedure is simple, controllable, and eliminates the use of solvents, water, drying, curing or the application of heat to successfully coat yarns with hot melt adhesive compositions.

Hot melt compositions, especially those based upon copolymers of ethylene with acrylic or methacrylic acid are described in U.S. Pat. No. 4,136,069 and U.S. Pat. No. 4,401,782 and these disclosures are hereby incorporated by reference. Other hot melt adhesive compositions are referred to in U.S. Pat. No. 4,576,665 and this disclosure is incorporated by reference as well. These compositions are typically non-aqueous and are applied as a melt at elevated temperatures yet, when they cool under ambient conditions, they form a solid, non-tacky layer. The hot melt compositions used in the present invention constitute a major proportion of the total weight of the glass fibers used to bond the edge portions of the glass fabric. When calculated on the basis of coating content, a coating composition termed a "size" amounts to only about 3 to 4%, whereas the hot melt adhesive coated glass yarns of the present invention have a coating content of from about 40 to about 70%. These more significant quantities serve to secure adjacent glass fibers together rather than merely "size" individual glass fibers temporarily for further processing operations.

Hot melt adhesives may be applied to the yarn in a number of different ways, however for purposes of the present invention, we prefer to apply the hot melt adhesive by passing the yarn through a die which provides the necessary thickness and wet pick-up to achieve the results desired. It is important that the hot melt adhesives used in the present invention exhibit a relatively low viscosity at application temperatures. Preferably less than 2,000 cps to reduce tension on the yarn during coating. Good performance is obtained with a hot melt adhesive having a viscosity of about 750 cps at 350° F. This viscosity characteristic coupled with fast setting times, low remelt temperatures of about 220° F., good pot life of up to 72 hours, and lock of toxicity, contribute to a useful hot melt adhesive. Indeed, many hot melt adhesives suitable for use are approved for food use whereas other thermoplastic materials, for instance nylon strands, smoke considerably and discolor under operational temperatures and are not fully acceptable for these reasons.

Fiberglass fabrics prepared on a shuttleless or airjet loom have an edge or selvage different from a selvage prepared on a conventional loom which is woven with a continuous filling strand around the edge of the cloth. Feathered edged glass fabrics have filling tails extending beyond the cloth edge and these tails are held in place at the edge of the fabric by wrapper, usually leno, threads causing the tails to be feathered out. This results in a flat, uniform, and tight selvage along the edges of the fiberglass fabric, as well as other advantages inherent in glass fabrics having feathered edges. The body or woven portion of the fabric may be of any particular weave, and there are any number of weave patterns possible.

Almost any weave construction can be woven from glass yarns that can be made from other types of yarn, natural or synthetic, however for industrial uses the weave pattern will be one of the following: plain weave, in which warp and filling threads cross alternately; twill weave, in which each end floats over at least two consecutive picks enabling a greater number of yarns per unit area than a plain weave; leno weave, having two or more warp threads cross over each other and interlace with one or more filling threads; a mock leno weave; a four harness satin, in which a filling thread floats over three warp threads then under one; and an eight harness satin, a 7 by 1 interlacing in which a filling thread floats over seven warp threads and then under one. In addition, the thickness of the glass fabric may vary widely as well as the weight (measured on the basis of square yards) which may range from less than one ounce to up to two pounds per square yard. The fabric construction, yarn size, twist and finish may also be varied in order to fit individual applications for the woven glass fiber product.

Figure 1:
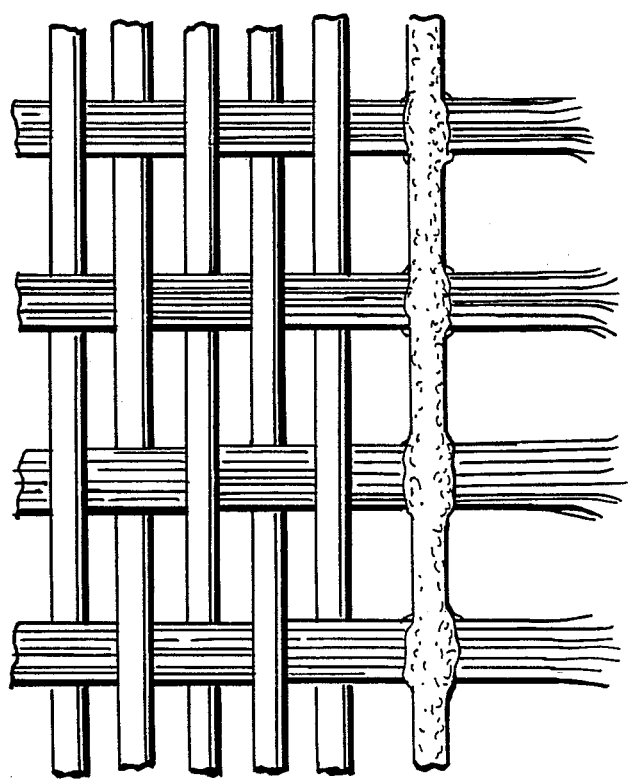
FIG. 1 is an enlarged representation of the bonded edge of a fiberglass fabric woven on a shuttleless loom in which the feathered edge is secured and edge ravelling prevented by a pair of glass fiber yarns coated with a hot melt adhesive composition securing the fibers of the edge of the glass fabric together.

Edge bonded glass fabrics produced by the procedure of the present invention exhibit excellent bonds along the fabric edge, the pair of leno coated glass yarns serving to secure the adjacent glass fill yarns without substantial wicking of the adhesive into the body of the fabric. Although leno weaves are preferred, the fabric edge shown in FIG. 1 does not highlight this fact.

The invention will be further described with reference to the attached drawings and the following examples in which all parts and percentages are expressed by weight and all temperatures reported in °F.

EXAMPLE

A fiberglass yarn, known in the industry as D 450's 1/0, was coated using the apparatus described in FIG. 2. A round tungsten carbide die, known generally as a wire die, available from Sancliff Company was used. The orifice in the die was a round hole 0.008" in diameter. The hot melt coating material was Eastabond A-620, hot melt adhesive made by Eastman Chemical Co. The hot melt bath and heated die were maintained at approximately 325° F. Yarn was removed form the yarn supply package passed into the heated bath and drawn through the heated die at a speed of 150 yards per minute. The hot melt coating solidified at ambient temperature in the span between the heated die and the turn around pulley about 9 feet. A smooth, uniformly coated yarn was obtained which had a coating pick-up of approximately 100% (50% coating content of coated yarn).

This yarn was then used as the leno locking weave in a glass fabric woven on a shuttleless loom. Once woven into the glass fabric along its edges, the edge was bonded on the loom using a contact heating element maintained at about 300° F.

The resulting fabric exhibited a fused edge with an excellent bond and resisted ravelling upon further handling.

What is claimed is:

1. A process for weaving a fabric or inorganic warp and weft yarns and securing and thermobonding the longitudinal edges thereof from ravelling, said process comprising the successive steps of:
   (a) weaving inorganic warp and weft yarns on a shuttleless loom into a fabric and including a pair of coated inorganic warp yarns only along each longitudinal edge of the thus woven fabric, the coated inorganic warp yarns woven in leno fashion and having a hot melt composition thereon; and thereafter
   (b) thermobonding both edge portions of the woven fabric by heating the woven fabric along each longitudinal edge to melt and mobilize the hot melt composition and then allowing the heated edges to cool to secure and thermobond the adjacent warp and weft yarns at their crossover points and secure the fabric edges from ravelling.

2. The process of claim 1 in which the inorganic yarns are glass yarns.

3. The process of claim 2 in which at least 40% of the weight of each of the coated glass yarns is constituted by the hot melt composition.

4. The process of claim 3 in which the hot melt composition constitutes form 40 to 70% of the weight of each of the coated glass yarns.

5. The process of claim 2 in which the hot melt composition is a non-tacky solid at about 70° F. and forms a melt at at least 200° F.

6. A process of bonding a feathered glass fabric edge and securing the selvage of glass fabric woven on a shuttleless loom, the process including the steps of:
 (1) providing a glass yarn coated with a hot melt composition that is non-tacky and solid at about 70° F. and forms a melt at at least about 200° F., the hot melt coating constituting at least about 40% of the weight of the yarn;
 (2) weaving glass warp and weft yarns into a fabric on a shuttleless loom and inserting at least one coated glass warp yarn, woven leno fashion, adjacent a longitudinal edge only of the glass fabric;
 (3) heating the glass fabric woven in step (2) along the longitudinal edge at which the coated glass warp yarn was inserted and thermobonding the adjacent glass yarns thereby securing and bonding the glass yarns of the longitudinal edge of the fabric.

7. The process of claim 6 in which a pair of coated glass warp yarns is inserted in leno fashion adjacent only the longitudinal edge of the glass fabric.

8. The process of claim 6 in which a pair of coated glass warp yarns are inserted in leno fashion adjacent both longitudinal edges of the glass fabric.

9. The feathered glass fabric with its edges bonded by a hot melt composition produced by the process of claim 6.

* * * * *